(12) United States Patent
Wu

(10) Patent No.: US 8,018,694 B1
(45) Date of Patent: Sep. 13, 2011

(54) OVER-CURRENT PROTECTION FOR A POWER CONVERTER

(75) Inventor: Andrew Wu, Campbell, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 940 days.

(21) Appl. No.: 11/707,685

(22) Filed: Feb. 16, 2007

(51) Int. Cl.
    *H02H 7/00* (2006.01)
(52) U.S. Cl. ........................................ 361/18
(58) Field of Classification Search ............ 361/18
    See application file for complete search history.

(56) References Cited

U.S. PATENT DOCUMENTS

| | | |
|---|---|---|
| 3,491,252 A | 1/1970 | Petrohilos |
| 3,555,399 A | 1/1971 | Buchanan et al. |
| 3,840,797 A | 10/1974 | Aggen et al. |
| 3,916,224 A | 10/1975 | Daniels et al. |
| 4,072,965 A | 2/1978 | Kondo |
| 4,143,282 A | 3/1979 | Berard, Jr. et al. |
| 4,228,493 A | 10/1980 | de Sarte et al. |
| 4,236,198 A | 11/1980 | Ohsawa et al. |
| 4,495,554 A | 1/1985 | Simi et al. |
| 4,559,590 A | 12/1985 | Davidson |
| 4,622,627 A | 11/1986 | Rodriquez et al. |
| 4,695,936 A | 9/1987 | Whittle |
| 4,706,176 A | 11/1987 | Kettschau |
| 4,706,177 A | 11/1987 | Josephson |
| 4,720,641 A | 1/1988 | Faini |
| 4,725,769 A | 2/1988 | Cini et al. |
| 4,734,839 A | 3/1988 | Barthold |
| 4,739,462 A | 4/1988 | Farnsworth et al. |
| 4,806,844 A | 2/1989 | Claydon et al. |
| 4,809,148 A | 2/1989 | Barn |
| 4,811,184 A | 3/1989 | Koninsky et al. |
| 4,814,674 A | 3/1989 | Hrassky |
| 4,858,094 A | 8/1989 | Barlage |
| 4,862,339 A | 8/1989 | Inou et al. |
| 4,866,590 A | 9/1989 | Odaka et al. |
| 4,870,555 A | 9/1989 | White |
| 4,887,199 A | 12/1989 | Whittle |
| 4,888,497 A | 12/1989 | Dallabora et al. |

(Continued)

FOREIGN PATENT DOCUMENTS

EP 0 651 440 A1 5/1995

(Continued)

OTHER PUBLICATIONS

R. Brucker, et al., "Optimizing Converter Design and Performance Utilizing Micro Controller System Feedback and Control," Proceedings of Powercon 8, E-2, pp. 1-10, 1981.

(Continued)

*Primary Examiner* — Jared J Fureman
*Assistant Examiner* — Scott Bauer
(74) *Attorney, Agent, or Firm* — Sidley Austin LLP

(57) ABSTRACT

In one embodiment, a method is provided for a power converter system. The method includes: providing a primary current limit for the power converter system, wherein the power converter system has one or more transistors which can be switched on at a primary frequency to cause current to flow through an inductor of the power converter system; and using the primary current limit for over-current protection in the power converter system, wherein over-current protection does not employ any secondary frequency for switching of the one or more transistors and does not employ any secondary current limit.

38 Claims, 4 Drawing Sheets

U.S. PATENT DOCUMENTS

| | | | | |
|---|---|---|---|---|
| 4,890,210 A | | 12/1989 | Myers | |
| 4,928,200 A | * | 5/1990 | Redl et al. | 361/94 |
| 4,928,220 A | | 5/1990 | White | |
| 4,937,728 A | | 6/1990 | Leonardi | |
| 4,943,903 A | | 7/1990 | Cardwell, Jr. | |
| 4,943,907 A | | 7/1990 | Godwin | |
| 5,012,401 A | | 4/1991 | Barlage | |
| 5,014,178 A | | 5/1991 | Balakrishnan | |
| 5,021,937 A | | 6/1991 | Cohen | |
| 5,034,871 A | | 7/1991 | Okamoto et al. | |
| 5,041,956 A | | 8/1991 | Marinus | |
| 5,072,353 A | | 12/1991 | Feldtkeller | |
| 5,086,364 A | | 2/1992 | Leipold et al. | |
| 5,146,394 A | | 9/1992 | Ishii et al. | |
| 5,161,098 A | | 11/1992 | Balakrishnan | |
| 5,177,408 A | | 1/1993 | Marques | |
| 5,200,886 A | | 4/1993 | Schwarz et al. | |
| 5,245,526 A | | 9/1993 | Balakrishnan et al. | |
| 5,297,014 A | | 3/1994 | Saito et al. | |
| 5,313,381 A | | 5/1994 | Balakrishnan | |
| 5,394,017 A | | 2/1995 | Catano et al. | |
| 5,452,195 A | | 9/1995 | Lehr et al. | |
| 5,461,303 A | | 10/1995 | Leman et al. | |
| 5,481,178 A | | 1/1996 | Wilcox et al. | |
| 5,508,602 A | | 4/1996 | Borgato et al. | |
| 5,528,131 A | | 6/1996 | Marty et al. | |
| 5,552,746 A | | 9/1996 | Danstrom | |
| 5,563,534 A | | 10/1996 | Rossi et al. | |
| 5,568,084 A | | 10/1996 | McClure et al. | |
| 5,570,057 A | | 10/1996 | Palara | |
| 5,572,156 A | | 11/1996 | Diazzi et al. | |
| 5,617,016 A | | 4/1997 | Borghi et al. | |
| 5,619,403 A | | 4/1997 | Ishikawa et al. | |
| 5,621,629 A | | 4/1997 | Hemminger et al. | |
| 5,640,317 A | | 6/1997 | Lei | |
| 5,694,305 A | | 12/1997 | King et al. | |
| 6,498,466 B1 | * | 12/2002 | Edwards | 323/282 |
| 6,970,339 B2 | | 11/2005 | Wong et al. | |
| 7,304,464 B2 | * | 12/2007 | Weng et al. | 323/285 |
| 7,545,609 B2 | * | 6/2009 | Suzuki | 361/18 |
| 2003/0117752 A1 | * | 6/2003 | Gilbert et al. | 361/18 |
| 2003/0223159 A1 | * | 12/2003 | Jenkins et al. | 361/18 |
| 2007/0252567 A1 | * | 11/2007 | Dearn et al. | 323/282 |

FOREIGN PATENT DOCUMENTS

| | | |
|---|---|---|
| EP | 0 694 966 A1 | 1/1996 |
| EP | 0 736 957 A1 | 10/1996 |
| EP | 0 740 491 A1 | 10/1996 |
| EP | 0 748 034 A1 | 12/1996 |
| EP | 0 748 035 A1 | 12/1996 |
| EP | 0 751 621 A1 | 1/1997 |
| WO | WO 83/01157 | 3/1983 |

OTHER PUBLICATIONS

A.J. Bowen, et al., Power Supply with Optical Isolator, IBM Technical Disclosure Bulletin, vol. 14, No. 11, pp. 3320, Apr. 1972.

A. Halperin, "Primary Regulated Dual Power Supply," IBM Technical Disclosure Bulletin, vol. 21, No. 10, pp. 4299-4300, Mar. 1979.

H.S. Hoffman, Jr., et al., "Proportional Drive Supply with Diversion Control," IBM Technical Disclosure Bulletin, vol. 21, No. 12, pp. 4904-4905, May 1979.

D. Azzis, et al., "Flyback on Card Power Supply," IBM Technical Disclosure Bulletin, vol. 23, No. 4, pp. 1477-1478, Sep. 1980.

B. Pelly, et al., "Power MOSFETs Take the Load Off Switching Supply Design," Electronic Design, pp. 135-139, Feb. 1983.

"5-W DC-DC Converters Aim at Telecomm Applications," Electronic Design, vol. 31, No. 15, p. 227, Aug. 1985.

"Combined Switch-Mode Power Amplifier and Supply," IBM Technical Disclosure Bulletin, vol. 28, No. 3, pp. 1193-1195, Aug. 1985.

"Off-Line Power Supply Control Technique Using a Single Transformer to Back Three Control Signals," IBM Technical Disclosure Bulletin, vol. 32, No. 8A, Jan. 1990, pp. 272-273. Jan. 1990.

H.S. Hoffman, Jr., "Self-Generated Bias Supply," IBM Technical Disclosure Bulletin, vol. 20, No. 5, pp. 1814-1815, Oct. 1997.

Application Datasheet for Application Note 42032, "Fan 4822 Power Factor Correction with Zero Voltage Resonant Switching," Rev. 1.0.2 Oct. 10, 2001, pp. 1-12.

Philip Cooke, "The UCC3884 Frequency Foldback Pulse Width Modulator," Application Note U-164, Unitrode Corporation, pp. 1-17, 1999.

* cited by examiner

OVER-CURRENT PROTECTION FOR A POWER CONVERTER

BACKGROUND

1. Field of Invention

The present invention relates to power converters, and more particularly to, to over-current protection for a power converter.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." The power converters may also include one or more capacitors or inductors for alternately storing and outputting energy.

Short circuit protection in DC/DC switching regulators is necessary for protecting against catastrophic failures due to current ratcheting. Current ratcheting may occur in switching regulators using current mode control because the control loop takes a finite time to react. For example, in a DC/DC step-down switching regulator, when the output is shorted, almost the full voltage of the supply will appear across the inductor for a short period of time. The inductor current climbs or increases at a very fast rate. The internal current sense loop requires a certain amount of time to respond. When the current sense loop finally detects that the current is too high, there will be almost zero voltage across the inductor, which makes the current in the inductor decay very slowly. This process, which continues at the rate of the switching frequency, causes a "ratcheting" of the inductor current to very high levels—sometimes with catastrophic outcomes, such as a complete breakdown of the switching regulator. The peak amount of current in a current ratcheting situation depends on the switching frequency and loop speed of the entire circuit.

Various techniques according to previously developed designs provide short circuit protection by either employing frequency foldback (which reduces the average current in the switching regulator) or by providing a secondary current limit in the switching regulator. With frequency foldback when the output voltage of a switching regulator is fractionally lower than the intended voltage, the frequency of the regulator is slowed down to reduce the total amount of current. The lower frequency allows for more of the current in the inductor to discharge so that the average current is lower. Although the average current may be lower, the peak currents in the regulator remain the same. As such, larger input and output capacitors are still required due to voltage ripple concerns. Furthermore, the use of lower frequencies creates lower harmonics, which requires additional circuitry in the switching regulator to address. With techniques which provide a secondary current limit, the switching regulator is shut down when the current exceeds a certain threshold which is higher than the primary current limit. The switching regulator may restart after a certain amount of time has passed. Such techniques can be problematic because the secondary current limit may be higher than the maximum specified current rating for some applications. Also, both techniques (i.e., frequency foldback and secondary current limit) may increase component values.

SUMMARY

According to an embodiment of the present invention, a method is provided for over-current protection in a power converter system. The method includes: switching one or more transistors in the power converter system at a primary frequency to cause current to flow through an inductor of the power converter system; monitoring voltage at a compensation node, wherein the voltage at the compensation node is indicative of current flowing through the inductor of the power converter system; monitoring feedback voltage which is indicative of output voltage of the power converter system; and if the voltage at the compensation node reaches a predetermined value and the feedback voltage is fractionally lower than an expected reference value, ceasing the switching of the one or more transistors to allow the current flowing through the inductor to decay.

According to another embodiment of the present invention, a power converter system includes a first transistor and a second transistor coupled together in a half-bridge arrangement at a switching node. An inductor is coupled at the switching node. Current flows from the first transistor through the inductor. The power converter system has a primary current limit for the current flowing through the inductor. At least one of the first and second transistors is switched at a primary frequency to cause current to flow through the inductor. An overcurrent protection circuit is operable to monitor a voltage at a compensation node, wherein the voltage at the compensation node is indicative of current flowing through the inductor. A feedback circuit is operable to monitor a feedback voltage which is indicative of output voltage of the power converter system. If the voltage at the compensation node reaches a predetermined value and the feedback voltage is fractionally lower than an expected reference value, the overcurrent protection circuit and the feedback circuit output signals which cause the switching of the first and second transistors to cease, thus allowing the current flowing through the inductor to decay.

According to yet another embodiment of the present invention, a method is provided for a power converter system. The method includes: providing a primary current limit for the power converter system, wherein the power converter system has one or more transistors which can be switched on at a primary frequency to cause current to flow through an inductor of the power converter system; and using the primary current limit for over-current protection in the power converter system, wherein over-current protection does not employ any secondary frequency for switching of the one or more transistors and does not employ any secondary current limit.

According to still yet another embodiment of the present invention, circuitry provides protection against a short circuit in a power converter system. The power converter system has one or more transistors which can be switched on and off at a primary frequency to cause current to flow through an inductor in an amount up to a primary current limit. The circuitry includes an overcurrent protection circuit operable to monitor a voltage at a compensation node, wherein the voltage at the compensation node is indicative of current flowing through the inductor. A feedback circuit is operable to monitor a feedback voltage which is indicative of output voltage of the power converter system. If the voltage at the compensation node reaches a predetermined value and the feedback voltage is fractionally lower than an expected reference value, the overcurrent protection circuit and the feedback circuit output signals which cause the switching of the one or more transistors to cease, thus allowing the current flowing through the inductor to decay.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 4 of the drawings. Like numerals are used for like and corresponding parts of the various drawings.

In various embodiments, the present invention provides systems, circuitry, and methods for protection against catastrophic failures due to current ratcheting in a power converter system (which is a systemic problem of current mode control due to finite loop speed). The systems, circuitry, and methods may provide over-current or short circuit protection using the primary current limit of a power converter system (e.g., switching regulator) and normal switching frequency.

In one embodiment, a clamp circuit provided at the error signal of a current mode DC/DC voltage regulator dictates or sets the maximum current that can be sourced at the output. Once the clamp is activated, the maximum current at the load has been met. If the clamp is activated at a point where the output voltage of the regulator is low, then the high-side switch is turned off and the low-side switch is turned on. The current loop is reset, for example, by pulling the error voltage to ground. The voltage loop is restarted, for example, by pulling a softstart pin to ground. Once the inductor current has decayed to a predetermined level, the low-side latch and both the error voltage and the softstart pin are released, and the regulator resumes regulation as intended.

Figure 1:
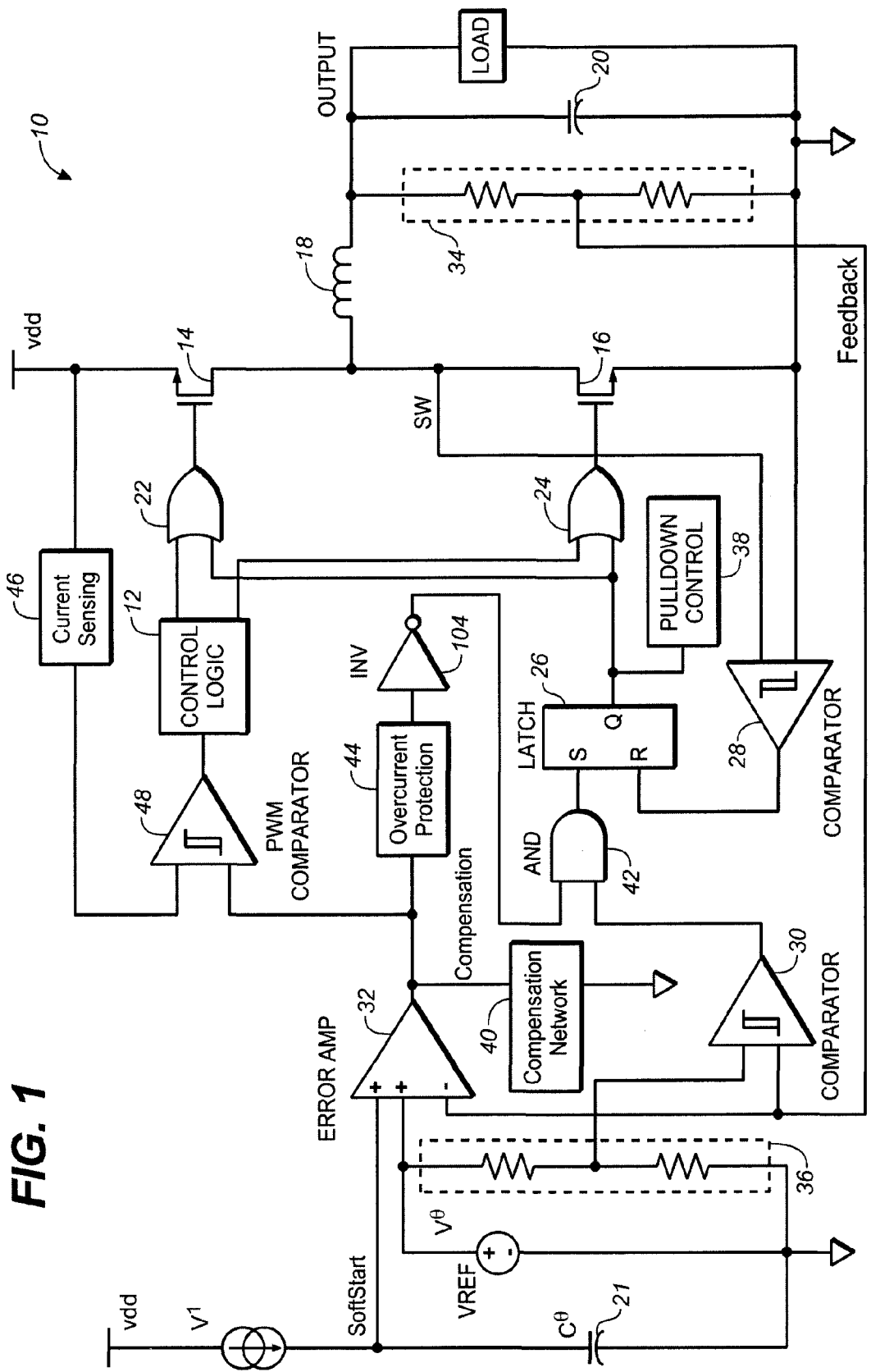
FIG. 1 is a schematic diagram of an exemplary implementation of a power converter system, according to an embodiment of the invention.

FIG. 1 is a block diagram of a power converter system 10, according to an embodiment of the invention. In this embodiment, power converter system 10 is a switching regulator and can provide a direct current (DC) power. Power converter system 10 can be incorporated in or used with any electronic device in which a DC-to-DC converter as described herein is needed. Power converter system 10 receives an input voltage Vin (as Vdd) and provides the DC power to a load at an output terminal Vout. In one embodiment, power converter system 10 can be a current-mode, synchronous buck converter which convert a voltage at a higher level (e.g., 5V) to a voltage at a lower level (e.g., 1V). In other embodiments, power converter system 10 can be a boost or buck-boost converter (not shown). Upon reading this disclosure, a skilled artisan can understand how to implement the present invention without undue experimentation. As shown, power converter system 10 also includes control logic 12, switches 14, 16, an inductor 18, an output capacitor 20, an input capacitor 21, OR gates 22, 24, a latch circuit 26, comparators 28, 30, error amplifier 32, resistor network 34, 36, pulldown control circuitry 38, compensation circuitry 40, AND gate 42, over-current protection circuitry 44, current sensing circuitry 46, and PWM comparator 48.

In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, inductor 18, capacitor 20, and resistor network 34 are implemented as discrete components, and remaining elements or components can be provided on a single chip or die, or on one or more separate die.

The inductor 18 is coupled to the output capacitor 20 at the output terminal Vout of the power converter system 10. As used herein, the terms "coupled" or "connected," or any variant thereof, covers any coupling or connection, either direct or indirect, between two or more elements. Current flows through inductor 18 for delivering power to the load at the output terminal and to charge and discharge output capacitor 20. The power converter system 10 has a primary current limit for the current flowing through inductor 18 (which can be implemented with current sensing circuitry 46 and over-current protection circuitry 44).

Switches 14 and 16 are coupled to the inductor 18. As shown, switches 14 and 16 are connected at a switching node (SW) in a half-bridge arrangement, with switch 14 being the "high-side" switch and switch 16 being the "low-side" switch. The high-side switch 14 may be connected between the input voltage Vin (Vdd) and node SW. The high-side switch 14 may be considered the power switch or device for power converter system 10. Switch 14 is turned on and off (for example, with a pulse width modulated (PWM) control) to ramp up and down the current of inductor 18, thus controlling or regulating the output voltage Vout at the output terminal of power converter system 10. The low-side switch 16 may be connected between the node SW and ground (GND), and provides or supports synchronous rectification. For synchronous rectification, the low-side switch 16 is turned off during the charge cycle for inductor 18, and turned on as inductor 18 discharges into the load. Each of the two switches 14, 16 can be implemented with any suitable device, such as, for example, a metal-oxide-semiconductor field effect transistor (MOSFET), an IGBT, a MOS-gated thyristor, or other suitable power device. Each switch 14 and 16 has a gate to which a respective driving voltage or control signal may be applied to turn the switch on or off.

Control logic 12, current sensing circuitry 46, PWM comparator 48, OR gates 22, 24, latch 26, comparators 28, 30, error amplifier 32, pulldown control circuitry 38, compensation circuitry 40, over-current protection circuitry 44, and AND gate 42 are coupled to the gates of switches 14 and 16, and work in conjunction to provide control signals for turning on and off the switches. One or both of the control signals can be a PWM control signal. This circuitry may be coupled to the output terminal (via resistor network 34) to receive the output voltage Vout as a feedback signal. The circuitry may also be coupled to the switching node (SW), and can be responsive to the voltage thereon.

Current sensing circuitry 46 senses the current through switch 14, which can be the same as that flowing through the inductor 18. Current sensing circuitry 46 can be implemented with a current sensing amplifier. The PWM comparator 48 receives the current sensing signal from current sensing circuitry 46. PWM comparator 48 also receives a signal from a compensation node (which, as shown, can be the junction between error amplifier 32, compensation circuitry 40, and over-current protection circuitry 44). The relationship between the current through inductor 18 and the compensation node is linear. Thus, the voltage or current at the compensation node is proportional to the value of the inductor current. When current through inductor 18 is at its maximum (the primary current limit), the value of the compensation node likewise is at its maximum. The PWM comparator 48 compares the two input signals and provides an output signal for pulse-width modulation to the control logic 12.

Control logic 12 may generate control signals for controlling the switches 14 and 16. These control signals may be provided at a particular (primary) frequency during normal operation of the power converter system 10. The control logic 12 provides a respective control signal to each of OR gates 22 and 24. The other input of each of OR gates 22, 24 are coupled to receive the output of latch circuit 26.

The latch circuit 26, as shown, can be implemented as a set-reset (SR) flip-flop. The set input of the latch circuit 26 receives the output from over-current protection circuitry 44, and the reset input receives the output from comparator 28. Latch circuit 26 provides a signal to each of the OR gates 22 and 24. When the over-current protection circuitry outputs a signal indicating that there is an over-current condition or short-circuit, latch circuit 26 is set so that normal switching is halted—the high-side switch 14 is latched off, and the low-side switch 16 is latched on. The application of a reset signal to the reset input of the latch circuit 26 releases the latch circuit 26 and allows the normal switching behavior to resume or continue for switches 14 and 16.

Comparator 28 has one input terminal coupled to the SW node and another input terminal coupled to ground (GND). Comparator 28 may function to detect when the inductor current is going to zero. When a short circuit occurs, the current in the inductor 18 is positive, which means that the output is being charged. When the inductor current is positive and switch 16 is on, the voltage at the node SW is negative. The logic circuitry of power converter system 10 latches on switch 16, which cause the current through inductor 18 to decay and then go negative. When the current in the inductor 18 goes negative, the voltage at the SW node becomes positive due to the resistance of the switch 16. Comparator 28 outputs a signal to reset latch circuit 26 when the voltage at the SW node changes from negative to positive, indicating a zero current crossing. This zero current cross detection releases the latch circuit 26 and allows the normal switching behavior to resume or continue.

The OR gates 22, 24 each receive the output signal from latch circuit 26 and a respective signal from control logic 12. The OR gates 22, 24 each perform an OR operation on the received input signals and provide a drive signal to the gates of switches 14, 16, respectively.

Error amplifier 32 is coupled to receive a reference voltage Vref at one input terminal and to receive a feedback signal derived from the output voltage Vout at another input terminal. Resistor network 34 develops this output voltage feedback signal. The error amplifier 32 compares the output voltage feedback signal to a voltage reference to create an error voltage. This error voltage signal is provided to the over-current protection circuitry 44 at the compensation node. The error voltage at the compensation node is part of the current loop. The error amplifier 32 also receives a soft start signal. Soft-start circuitry is part of the voltage loop. The soft start circuitry functions to limit the amount of current delivered to the load of power converter system 10 at start-up. This occurs when the soft start signal is lower than reference voltage Vref. When a short circuit occurs, the soft start signal can be reset to 0V, for example, by operation of the pulldown control circuitry 38.

The pulldown control circuitry 38 allows the power converter system 10 to begin operation without large currents at start-up to charge the load capacitor 20. The pulldown control circuitry 38 is responsive to the output signal from latch circuit 26. The pulldown control circuitry 38, which may comprise one or more switches, may function to discharge capacitors in the compensation circuitry 40 and the softstart circuitry (e.g., capacitor 21). This causes the current and voltage loops to reset.

Compensation circuitry 40 functions to smooth out the voltage at the compensation node, thereby stabilizing the control loop. The compensation circuitry 40 can be implemented with a resistor and a capacitor to make the loop stable. The voltage at the compensation node is compared to the current sense signal (output from current sensing circuitry 46), which is proportional to the inductor current. The current limit for the power converter system 10 is achieved by clamping the voltage of the compensation node. This limits the value to which the sensed current flowing through the inductor 18 can rise. In other words, the peak current in the inductor 18 is sensed by a current sensing circuitry 46 and then compared at PWM comparator 48 to the voltage at the compensation node. When the voltage of the compensation node is maximum, inductor current is maximum.

Comparator 30 also receives the output voltage feedback signal (from resistor network 34), and compares this to a reference voltage (which can be developed from Vref by resistor network 36). The comparator 30 outputs a signal which is provided to one input of the AND gate 42. The other input of the AND gate 42 receives a signal output from the over-current protection circuitry 44. AND gate 42 performs a logic operation on these two signals, and provides an output to latch circuit 26.

Over-current protection circuitry 44 generally functions to protect power converter system 10 from an over-current condition, such as may occur when output terminal is short-circuited. The over-current protection circuitry 44 may be designed so that the average current during short circuit is reduced, and the part (semiconductor die or integrated circuit in which over-current protection circuitry 44 is implemented) protects itself and the power converter system 10 from catastrophic failure.

Over-current protection circuitry 44 is responsive to the voltage at the compensation node, which is proportional to the current through the inductor 18. The relationship between the inductor current and the compensation node voltage is linear. In one embodiment, the over-current protection circuitry 44 may monitor the error voltage signal (output from the error amplifier 32) at the compensation node. During operation, the voltage at the compensation may start at a low value and rise over time. When the voltage of the compensation node reaches a particular (e.g., predetermined) value, the over-current protection circuitry 44 clamps or fixes the compensation node voltage at that value. The over-current protection circuitry 44 then outputs a current limit clamp signal which limits the maximum amount of current in the inductor 18 to the primary current limit of the power converter system 10. In other words, the clamp of over-current protection circuitry 44 is tripped when the maximum current is reached, as indicated by a current limit clamp signal. Over-current protection circuitry 44 provides an output signal to the AND gate 42 (through inverter gate 104). When the clamp of the over-current protection circuitry 44 has been tripped, the value of this output signal from over-current protection circuitry 44 causes the low-side switch 16 to be turned on and high-side switch 14 to be turned off until the current through inductor 18 has decayed to, for example, zero or near zero. At the same time, the error voltage is pulled down to ground to effectively reset the current loop and restart the cycle. In one embodiment, over-current protection circuitry 44 also resets the pull-down compensation and softstart circuitry 38, thus restarting the voltage loop. This is done so that when the short circuit is released, the power converter system 10 can return to regulation as intended upon enable.

Over-current protection circuitry 44 differs from circuits according to previously developed techniques. Over-current protection circuitry 44 establishes and uses the primary current limit for the power converter system 10—i.e., it does not use a separate, secondary current limit which is distinct from that of the power converter system 10. Furthermore, over-current protection circuitry 44 does lower or alter the frequency of the power converter system 10 from its normal operating frequency. That is, as over-current protection circuitry 44 functions to protect the power converter system 10 against an over-current condition, the power converter system 10 continues operating at its normal frequency.

In operation, when the current limit has not been exceeded, power converter system 10 drives high-side switch 14 and low-side switch 16 at normal operating frequency, thus causing current to flow through inductor 18. Over-current protection circuitry 44 monitors the voltage at the compensation node (output from error amplifier 32). If the compensation node voltage exceeds the predetermined value, clamp circuit 100 in over-current protection circuitry 44 is tripped. This may occur when the output voltage is low (which can correspond to a short circuit in power converter system 10). Over-current protection circuitry 44 outputs a signal which is inverted by inverter gate 104 and provided to one input terminal of AND gate 42. If the output voltage Vout is fractionally lower than the reference voltage Vref (e.g., ¼, ⅓, ½, or ¾ of Vref), then comparator 30 provides an output to the other input terminal of AND gate 42. These signals at the input terminals of AND gate 42 result in an output which causes the high-side switch 14 to latch off and the low-side switch 16 to latch on. This allows the inductor current to decay to a pre-determined level (e.g., near zero). The error voltage will be pulled to ground, effectively resetting the current loop of power converter system 10. Furthermore, the softstart pin (for pulldown compensation and softstart circuitry 38) will be pulled to ground, effectively restarting the voltage loop. Once the current through inductor 18 has decayed to a predetermined level (e.g., zero or near zero), the low-side switch 16 and both the error voltage and the softstart pin will be released, and the power converter system 10 may again function to regulate the voltage at the output in normal switching.

Figure 2:
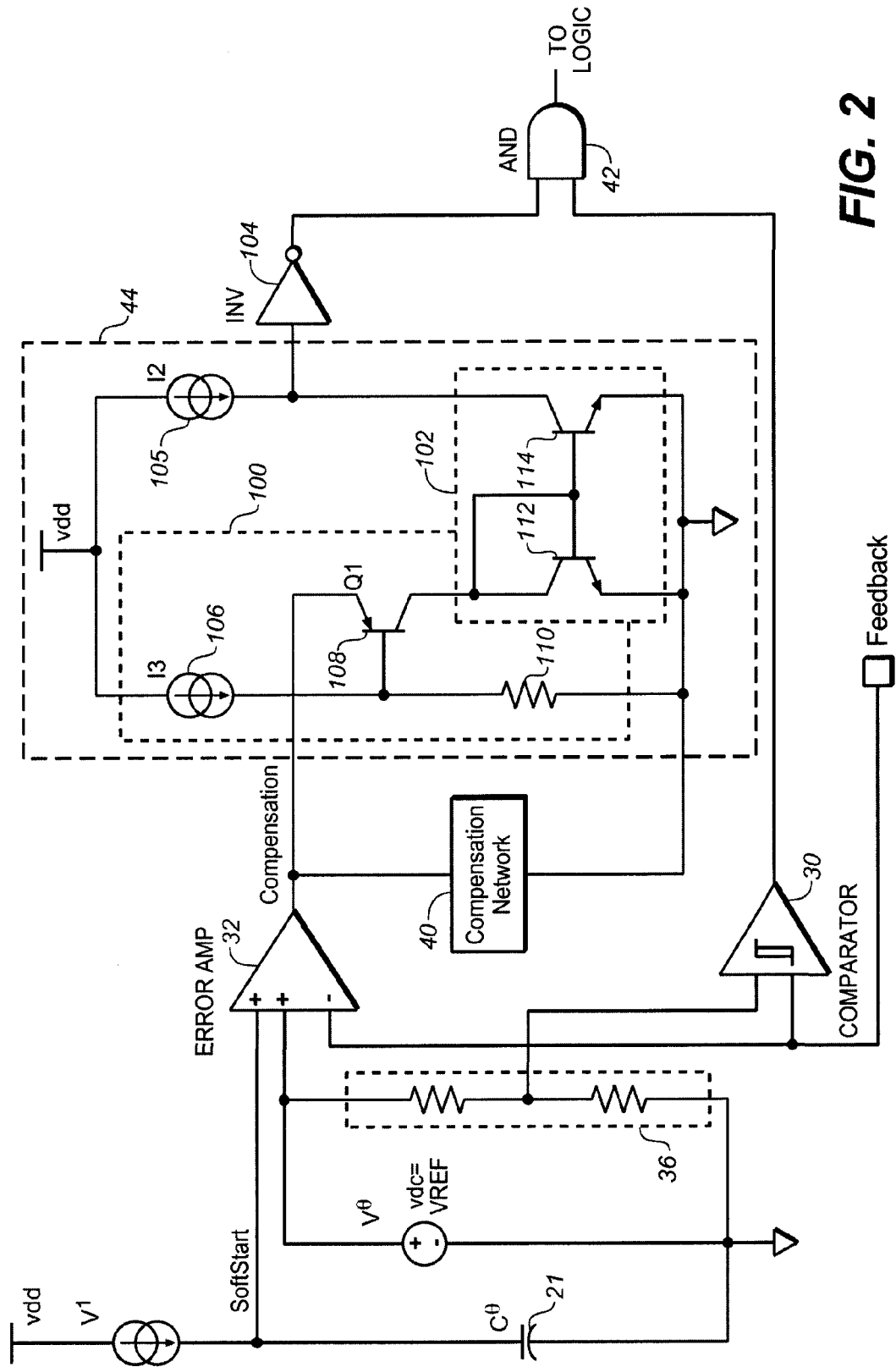
FIG. 2 is a schematic diagram of an implementation of an over-current protection circuitry along with other components of a power converter system, according to an embodiment of the invention.

FIG. 2 is a schematic diagram of an implementation of an over-current protection circuitry 44 along with other components of a power converter system, according to an embodiment of the invention. Over-current protection circuitry 44 may be incorporated in or used with a power converter system. As shown, over-current protection circuitry 44 includes a clamp circuit 100, a current mirror 102, and a current source 105.

In one embodiment, clamp circuit 100 comprises a current source 106, a switch or transistor 108, and a resistor 110. Clamp circuit 100 clamps the voltage at the compensation node (output from the error amplifier 32) to keep the voltage from rising above a fixed value. Resistor 110 and current source 106 are connected to the control terminal of the transistor 108. The values of resistor 110 and current source 106 can be selected to establish the tripping point of clamp circuit 100. The clamping of the compensation node voltage at the tripping point dictates the maximum current that can be sourced at the output and establishes the primary current limit for the power converter system 10. Over-current protection circuitry 44 thus uses clamp circuit 100 to determine when the maximum current is reached—i.e., when the current has met the primary current limit. When the clamp circuit 100 is tripped by the compensation node voltage rising the particular value, the transistor 108 turns on and current flows therethrough.

Current mirror 102 is coupled to clamp circuit 100 and current source 105. Current mirror 102 may comprise switches or transistors 112 and 114. Transistor 112 is coupled to transistor 108 of the clamp circuit 100. Transistor 114 is coupled to current source 105. Current mirror 102 mirrors the current which flows in clamp circuit 100. In particular, when clamp circuit 100 is tripped, the current through transistor 108 flows into transistor 112 of current mirror 102. This current in transistor 112 is mirrored by current flow from current source 105 through transistor 114.

The voltage at the node between the current source 105 and the current mirror 102 (at which inverter gate 104 is coupled) is the output signal for over-current protection circuitry 44. Inverter gate 104 inverts the output signal from over-current protection circuitry 44.

As apparent from the description herein, in one embodiment, the values of the components in over-current protection circuitry 44 (i.e., current sources 106, 105, resistor 110, switches 108, 112, and 114) can be selected to set the current limit for the power converter system 10.

Figure 3:
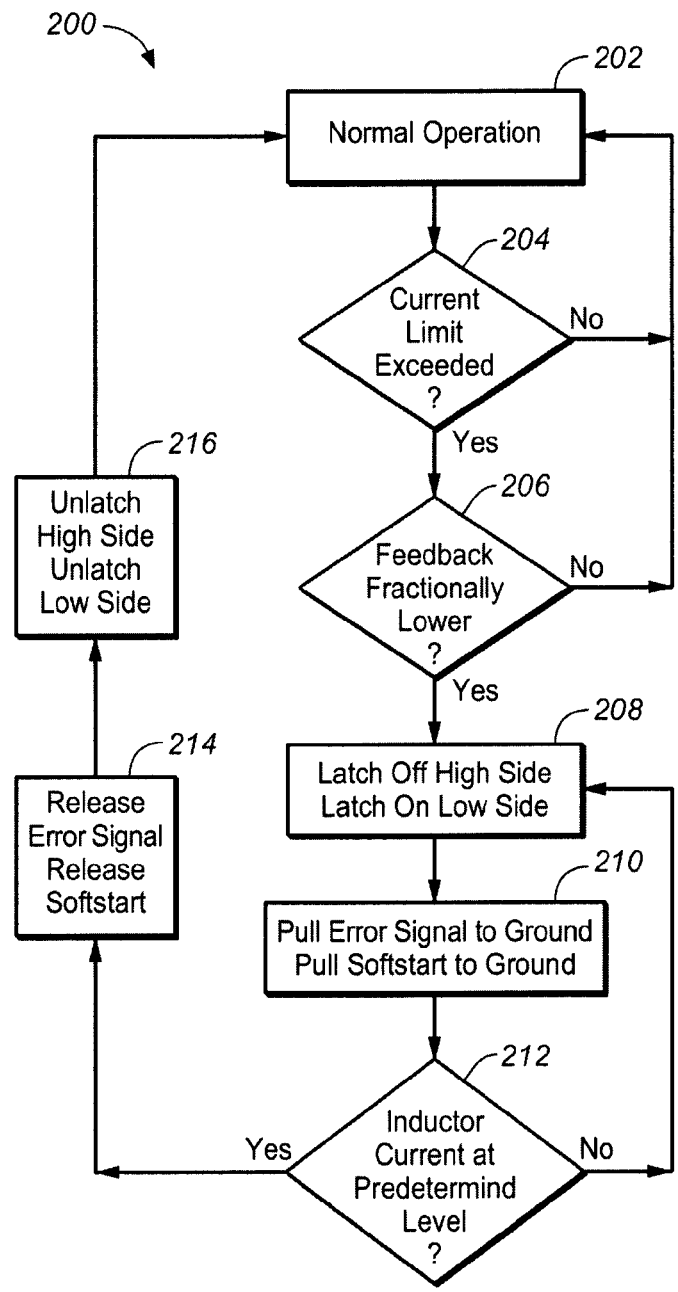
FIG. 3 is a flow diagram of exemplary method for improved over-current protection in a power converter system, according to an embodiment of the invention.

FIG. 3 is a flow diagram of exemplary method 100 for improved over-current protection in a power converter system, according to an embodiment of the invention. In one embodiment, this method 100 may be performed in or implemented by the power converter system 10 having over-current protection circuitry 44 (shown and described in FIGS. 1 and 2).

At block 202 in method 200, the power converter system 10 is in normal operation, thus, for example, converting a voltage at a higher level (e.g., 5V) to a voltage at a lower level (e.g., 1V).

At block 204, over-current protection circuitry 44 monitors to determine if the current limit for the inductor 18 is exceeded. The maximum current limit is set by the clamp of the over-current protection circuitry 44. At block 206, the comparator 30 monitors to determine if the feedback from the output voltage Vout is fractionally lower than the expected (reference) voltage. If both the current limit for the inductor 18 is exceeded (at block 204) and the feedback is fractionally lower than the reference voltage Vref, then method 200 continues to block 208. Otherwise, if the current limit is not exceeded or if the feedback voltage is not fractionally lower, then the power converter system 10 continues in normal operation at block 202.

At block 208, when primary current limit is reached and the voltage at the output is fractionally lower, the over-current protection circuitry 44 (along with comparator 30) output signals which cause the high-side switch 14 to be latched off and the low-side switch 16 to be latched on. At block 210, the pulldown control circuitry 38 (responsive to the output from latch circuit 26) discharges the capacitors in compensation circuitry 40 and the softstart circuitry, thereby pulling the error voltage (output from the error amplifier 32) at the compensation node to ground to reset the current loop and restarting the voltage loop.

At block 212, over-current protection circuitry 44 determines if the current in the inductor 18 has reached (decayed to) a predetermined (safe) level. If not, method 200 returns to block 208 where over-current protection circuitry 44 continues to causes the high-side switch 14 to be latched off and the low-side switch 16 to be latched on. Otherwise, when the current in the inductor 18 reaches the predetermined (safe) level, method 200 moves to block 214, where the over-current protection circuitry 44 releases the error signal and the softstart capacitor so that discharging of the error voltage and the softstart capacitor are discontinued.

At block 216, over-current protection circuitry 44 causes the latches for the high-side switch 14 and the low-side switch 16 to be released. Method 200 moves to block 202 where the power converter system 10 resumes normal operation.

Figure 4:
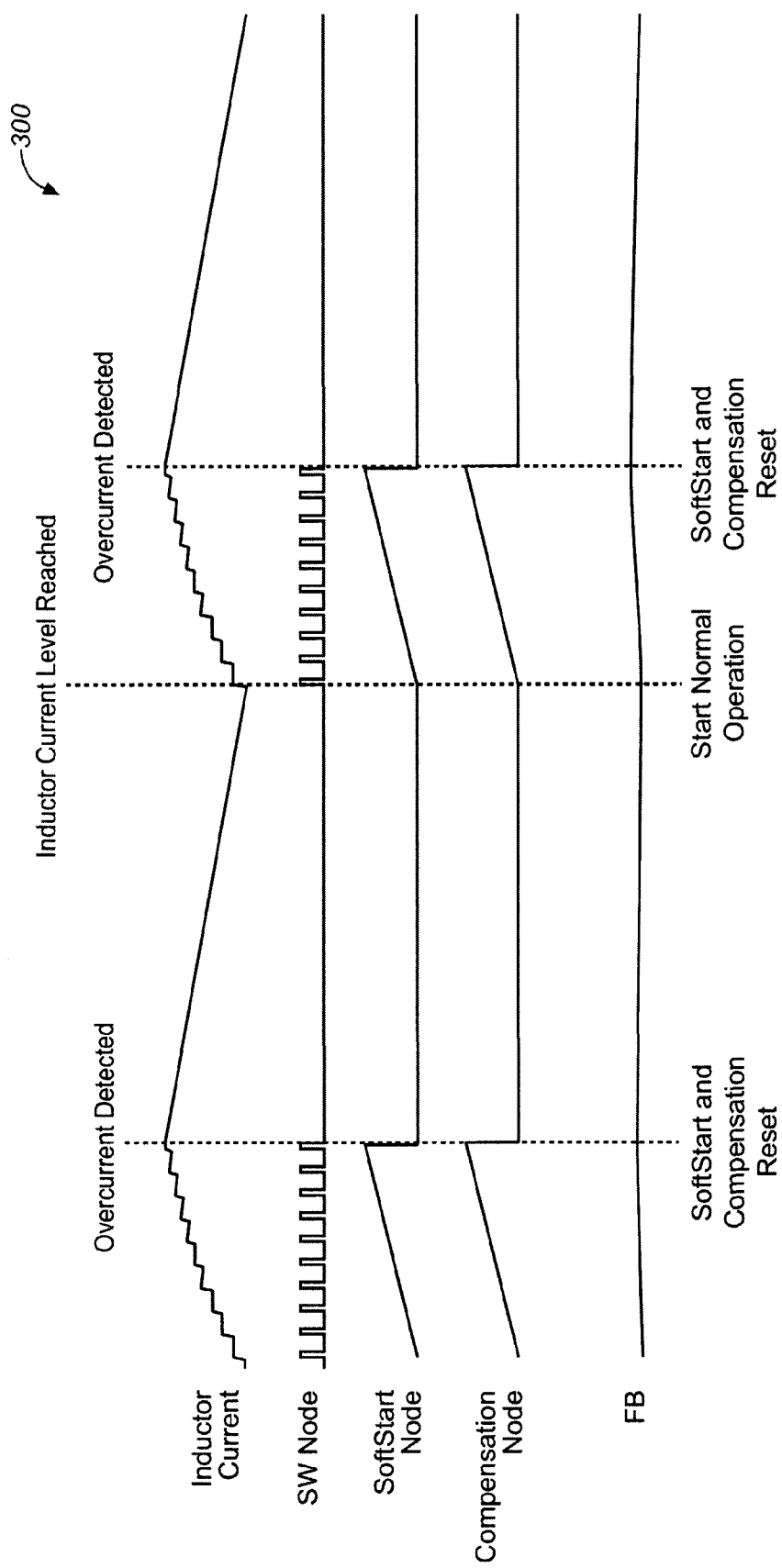
FIG. 4 is a waveform diagram illustrating an exemplary operation of the power converter system, according to an embodiment of the present invention.

FIG. 4 is a waveform diagram 300 illustrating an exemplary operation of the power converter system 10, according to an embodiment of the present invention. Diagram 300 shows that when power converter system 10 is not experiencing an over-current condition, the voltage at the SW node is regularly switching. During this time, the current through inductor 18 may be increasing, and the voltages at compensation node and softstart node are increasing. When the current through inductor 18 reaches the primary current limit for power converter system 10, the voltage at compensation node reaches a predetermined value which triggers the clamp circuit 100 in the overcurrent protection circuitry 44, thereby detecting the over-current condition. When the over-current condition is detected, over-current protection circuitry 44 outputs a signal which causes latch circuit 26 to halt the driving or switching of switches 14 and 16. Thus, the voltage at SW node does not change. The voltages at the compensation node and softstart node are pulled down, for example, by the pulldown control circuitry 38 discharging the capacitors in the softstart and compensation circuitry. This resets the voltage and current loops. The current flowing through inductor 18 decreases. When the inductor current decays to or reaches a certain (safe) level, comparator 28 outputs a signal to reset the latch circuit 26. This allows power converter system 10 to resume normal switching.

Previously developed techniques for over-current or short circuit protection in a power converter (e.g., a DC/DC switching regulator) may utilize frequency foldback circuits and/or secondary current limits. Such frequency foldback circuits can be problematic. For example, the frequency foldback circuits can introduce secondary frequencies which create noise in the power converters. Also, the frequency foldback circuits may generate larger ripple current which require larger-sized components (e.g., capacitors) to handle. A secondary current limit is problematic because it increases the maximum specified current rating for the power converter. This may result in peak currents that are be too high for some applications, and furthermore, may increase component values.

As described herein, embodiments of the present invention provide or implement a technique for over-current protection in a power converter system. In some embodiments, the present invention provides short circuit protection in a DC/DC switching regulator, which is necessary for protecting against catastrophic failures due to current ratcheting, a systemic problem of current control due to finite loop speed. Compared to previously developed designs, embodiments of the present invention can offer the numerous advantages. For example, the power converter system and corresponding methods, as described herein, do not employ either frequency foldback or a secondary current limit for over-current or short circuit protection. Instead, embodiments of the present invention use the primary current limit of the power converter system and do not change the normal switching frequency. Thus, only the maximum specified current limit will be seen in application or operation of the power converter system. Furthermore, the operating frequency remains constant.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A method for over-current protection in a power converter system, the method comprising:
   switching one or more transistors in the power converter system at a primary frequency to cause current to flow through an inductor of the power converter system;
   comparing a feedback voltage which is indicative of output voltage of the power converter system against a reference value and outputting a voltage at a compensation node in response;
   monitoring the voltage at the compensation node, wherein the voltage at the compensation node is indicative of current flowing through the inductor of the power converter system;
   if the voltage at the compensation node reaches a predetermined value and the feedback voltage is fractionally lower than the reference value, clamping the voltage at the compensation node so that the switching of the one or more transistors ceases, thus allowing the current flowing through the inductor to decay;
   when the current flowing through the inductor has decayed to a predetermined level, allowing the switching of the one or more transistors to resume.

2. The method of claim 1 wherein the power converter system does not employ any secondary frequency for switching of the one or more transistors.

3. The method of claim 1 comprising limiting the current through the inductor to a primary current limit for the power converter system.

4. The method of claim 3 wherein the power converter system does not employ any secondary current limit.

5. The method of claim 1 wherein the voltage at the compensation node is used in a current loop of the power converter system.

6. The method of claim 1 wherein the feedback voltage is used in a voltage loop of the power converter system.

7. The method of claim 1 comprising resetting a control loop of the power converter system when the current flowing through the inductor has decayed to the predetermined level.

8. The method of claim 7 wherein the control loop is a voltage loop.

9. The method of claim 7 wherein the control loop is a current loop.

10. The method of claim 1 wherein the occurrence of the voltage at the compensation node reaching the predetermined value and the feedback voltage being fractionally lower than the expected reference value indicates that a short circuit has occurred in the power converter system.

11. The method of claim 1 wherein the feedback voltage is fractionally lower than an expected reference value when the feedback voltage has a value that is less than one-half of the expected reference value.

12. The method of claim 1 wherein the feedback voltage is fractionally lower than an expected reference value when the feedback voltage has a value that is less than one-quarter of the expected reference value.

13. A power converter system comprising:
- a first transistor and a second transistor coupled together in a half-bridge arrangement at a switching node;
- an inductor coupled at the switching node and through which a current flows from the first transistor, wherein the power converter system has a primary current limit for the current flowing through the inductor;
- wherein at least one of the first and second transistors is switched at a primary frequency to cause current to flow through the inductor;
- an error amplifier operable to compare a feedback voltage which is indicative of output voltage of the power converter system against a reference value and to output a voltage at a compensation node in response;
- an overcurrent protection circuit operable to monitor the voltage at the compensation node, wherein the voltage at the compensation node is indicative of current flowing through the inductor; and
- a feedback circuit operable to monitor the feedback voltage;
- wherein if the voltage at the compensation node reaches a predetermined value and the feedback voltage is fractionally lower than the reference value, the overcurrent protection circuit clamps the voltage at the compensation node so that the switching of the first and second transistors ceases, thus allowing the current flowing through the inductor to decay
- when the current flowing through the inductor has decayed to a predetermined level, the overcurrent protection circuit allows the switching of the one or more transistors to resume.

14. The power converter system of claim 13 wherein the power converter system does not employ any secondary frequency for switching of the first and second transistors.

15. The power converter system of claim 13 wherein the power converter system does not employ any secondary current limit.

16. The power converter system of claim 13 wherein the overcurrent protection circuit comprises a latch circuit operable to latch the voltage at the compensation node to the predetermined value.

17. The power converter system of claim 13 wherein the overcurrent protection circuit comprises:
- a third transistor operable to be turned on when the voltage at the compensation node reaches the predetermined value; and
- a current mirror operable to mirror current flow through the third transistor;
- wherein the overcurrent protection circuit generates the output signal for causing the switching of the first and second transistors to cease when the third transistor is turned on.

18. The power converter system of claim 13 wherein the overcurrent protection circuit is part of a current loop of the power converter system.

19. The power converter system of claim 13 wherein the feedback circuit is part of a voltage loop of the power converter system.

20. The power converter system of claim 13 wherein the feedback circuit comprises a comparator operable to compare the feedback voltage against a reference voltage.

21. The power converter system of claim 20 comprising a softstart circuit operable to provide the reference voltage.

22. The power converter system of claim 13 wherein a control loop of the power converter system is reset when the current flowing through the inductor has decayed to the predetermined level.

23. The power converter system of claim 22 wherein the control loop is a voltage loop.

24. The power converter system of claim 22 wherein the control loop is a current loop.

25. The power converter system of claim 13 wherein the occurrence of the voltage at the compensation node reaching the predetermined value and the feedback voltage being fractionally lower than the expected reference value indicates that a short circuit has occurred in the power converter system.

26. The power converter system of claim 13 wherein the feedback voltage is fractionally lower than an expected reference value when the feedback voltage has a value that is less than one-half of the expected reference value.

27. The power converter system of claim 13 wherein the feedback voltage is fractionally lower than an expected reference value when the feedback voltage has a value that is less than one-quarter of the expected reference value.

28. Circuitry for providing protection against a short circuit in a power converter system, the power converter system having one or more transistors which can be switched on and off at a primary frequency to cause current to flow through an inductor in an amount up to a primary current limit, the circuitry comprising:
- an error amplifier operable to compare a feedback voltage which is indicative of output voltage of the power converter system against a reference value and to output a voltage at a compensation node in response;
- an overcurrent protection circuit operable to monitor the voltage at the compensation node, wherein the voltage at the compensation node is indicative of current flowing through the inductor; and
- a feedback circuit operable to monitor the feedback voltage;
- wherein if the voltage at the compensation node reaches a predetermined value and the feedback voltage is fractionally lower than the reference value, the overcurrent protection circuit clamps the voltage at the compensation node so that the switching of the first and second transistors ceases, thus allowing the current flowing through the inductor to decay;
- when the current flowing through the inductor has decayed to a predetermined level, the overcurrent protection circuit allows the switching of the one or more transistors to resume.

29. The circuitry of claim 28 wherein the overcurrent protection circuit comprises a latch circuit operable to latch the voltage at the compensation node to the predetermined value.

30. The circuitry of claim 28 wherein the overcurrent protection circuit comprises:
   a transistor operable to be turned on when the voltage at the compensation node reaches the predetermined value; and
   a current mirror operable to mirror current flow through the transistor.

31. The circuitry of claim 28 wherein the overcurrent protection circuit is part of a current loop of the power converter system.

32. The circuitry of claim 28 wherein the feedback circuit is part of a voltage loop of the power converter system.

33. The circuitry of claim 28 wherein the feedback circuit comprises a comparator operable to compare the feedback voltage against a reference voltage.

34. The circuitry of claim 28 wherein a control loop of the power converter system is reset when the current flowing through the inductor has decayed to the predetermined level.

35. The circuitry of claim 34 wherein the control loop is a voltage loop.

36. The circuitry of claim 34 wherein the control loop is a current loop.

37. The circuitry of claim 28 wherein the power converter system does not employ any secondary frequency for switching of the one or more transistors.

38. The circuitry of claim 28 wherein the power converter system does not employ any secondary current limit.

* * * * *